US005466604A

United States Patent [19]
Yang et al.

[11] Patent Number: 5,466,604
[45] Date of Patent: Nov. 14, 1995

[54] APPARATUS FOR MONITORING BIOLOGICAL ACTIVITY IN WASTEWATER AND CONTROLLING THE TREATMENT THEREOF

[75] Inventors: Xin Yang, Holland; Jaw E. Lee, Berwyn; William Armiger, Wayne; Sergey K. Maneshin, Upper Holland; Marcus E. Kolb, Phoenixville, all of Pa.

[73] Assignee: BioChem Technology, Inc., King of Prussia, Pa.

[21] Appl. No.: 208,020

[22] Filed: Mar. 8, 1994

[51] Int. Cl.[6] .................................................. C12M 1/34
[52] U.S. Cl. .................. 435/286.1; 435/810; 435/286.5; 435/286.7; 435/286.2
[58] Field of Search .................................. 435/291, 292, 435/810

[56] References Cited

U.S. PATENT DOCUMENTS

| | | | |
|---|---|---|---|
| 3,760,829 | 9/1973 | Schuk et al. | 137/93 |
| 3,925,721 | 12/1975 | Petroff | 324/0.5 R |
| 3,926,737 | 12/1975 | Wilson et al. | 195/108 |
| 4,246,101 | 1/1981 | Selby, III | 210/615 |
| 4,260,490 | 4/1981 | Moss et al. | 210/620 |
| 4,631,530 | 12/1986 | Gasper | 340/679 |
| 4,999,116 | 3/1991 | Bowers | 210/709 |
| 5,013,442 | 5/1991 | Davis et al. | 210/614 |
| 5,094,752 | 3/1992 | Davis et al. | 210/614 |
| 5,173,187 | 12/1992 | Nader et al. | 210/614 |
| 5,180,494 | 1/1993 | Yamaguchi et al. | 210/603 |

FOREIGN PATENT DOCUMENTS

| | | | |
|---|---|---|---|
| 662579 | 4/1977 | U.S.S.R. | C12B 1/08 |
| WO 90/10083 | 7/1990 | WIPO. | |
| WO 93/23738 | 11/1993 | WIPO. | |

OTHER PUBLICATIONS

George Hassapis, *Biological Oxygen Demand (BOD) Monitoring by a Multiprocessing System* IEEE Transaction on Instrumentation and Measurement, vol. 40, No. 6, Dec. 1991.

D. Jenkins and V. Tandoi, *The Applied Microbiology of Enhanced Biological Phosphate Removal–Accomplishments and Needs* Wat. Res. vol. 25, No. 12, pp. 1471–1478, 1991.

S. Ghekiere, H. Bruynooghe, K. Van Steenberger, I, Vriens, A. Van Haute and H. Verchtert, *The Effects of Nitrates and Carbon Compounds on Enhanced Biological Phosphorus Removal from Wastewaters*, European Water Pollution Control, vol. 1, No. 4, 1991.

A. Grabiń–Loniewska, *Denitrification Unit Biocenosis* Wat. Res. vol. 25, No. 12, pp. 1565–1573, 1991.

G. T. Daigger, J. A. Butz and J. P. Stephenson, *Analysis of Techniques for Evaluating and Optimizing Existing Full–Scale Wastewater Treatment Plants* Wat. Sci. Tech. vol. 25, No. 4–5, pp. 103–118, 1992.

A. R. Howgrave–Graham, F. M. Wallis & P. I. Steyn, *A Bacterial Population Anslysis of Granular Sludge from an Anaerobic Digester Treating a Maize–Processing Waste* Bioresource Technology 37 (1991) 149–156.

G. Hohn Kristensen, P. Elberg Jorgensen and M. Henze, *Characterization of Functional Microorganism Groups and Substrate in Activated Sludge and Wastewater by Aur, Nur and Our* Wat. Sci. Tech. vol. 25, No. 6, pp. 43–57, 1992.

Tomonori Matsuo, Takashi Mino and Hiroyasu Sato, *Metabilism of Organic Substances in Anaerobic Phase of Biological Phosphate Uptake Process* Wat. Sci. Tech. vol. 25,

(List continued on next page.)

*Primary Examiner*—David A. Redding
*Attorney, Agent, or Firm*—Miller & Christerbury

[57] ABSTRACT

Apparatus which monitors and controls biological activity of mixed liquor under anaerobic, anoxic and aerobic conditions by measuring the change of intracellular NAD(P)H of the microorganisms. A wastewater treatment system is controlled in accordance with the results generated by the monitoring system.

17 Claims, 11 Drawing Sheets

OTHER PUBLICATIONS

No. 6, pp. 83–92, 1992.
Ma, del Carmen Doria–Serrano, S. González–Martinenz and M. Hernández–Esparza, *Biochemical Models for Phosphate Accumulating Microorganisms* Wat. Sci. Tech. vol. 26, No. 9–11, pp. 2245–2248, 1992.

H. Spanjers and A. Klapwijk, *Continuous Estimation of Short Term Oxygen Demand from Respiration Measurements* Wat. Sci. Tech. vol. 24, No. 7, pp. 29–32, 1991.

Roles of NADH in BNR Process
Fig. 1

APPARATUS FOR MONITORING BIOLOGICAL ACTIVITY IN WASTEWATER AND CONTROLLING THE TREATMENT THEREOF

FIELD OF THE INVENTION

The present invention relates to apparatus for monitoring biological activity in wastewater and controlling the treatment thereof, and more particularly to apparatus for real time monitoring the metabolic activity of microorganisms in activated sludge used in a wastewater treatment process and using the results of such monitoring to control selected aspects of the treatment process.

BACKGROUND OF THE INVENTION

The prior art has employed many devices and systems to process and purify water from industrial operations and municipal sources prior to discharging the water. Activated-sludge wastewater treatment plants (WWTP's), which are well known in the art, have been most often utilized to address this problem. Additionally, many industrial and municipal water treatment plants utilize biological systems to pre-treat their wastes prior to discharging into the usual municipal treatment plant. In these processes, the microorganisms used in the activated sludge break down or degrade contaminants for the desired water treatment. Efficient process performance and control requires quick and accurate assessment of information on the activity of microorganisms. This has proven to be a difficult task in view of the wide variety of materials and contaminants that typically enter into treatment systems. Also, variations in the quantity of wastewater being treated, such as daily, weekly or seasonal changes, can dramatically change numerous important factors in the treatment process, such as pH, temperature, dissolved oxygen, nutrients and the like, alteration of which can be highly detrimental to proper wastewater treatment. Improperly treated wastewater poses serious human health dangers.

Various biological nutrient removal (BNR) processes are currently used in wastewater treatment plants to assist in contamination degradation. In a typical BNR process, contaminants in the wastewater, such as carbon sources (measured as biological oxygen demand or BOD), ammonia, nitrates, phosphates and the like are digested by the activated sludge in anaerobic, anoxic and aerobic stages, also known in the art. In the anaerobic stage, the wastewater, with or without passing through a preliminary settlement process, is mixed with return activated sludge (RAS), sometimes hereinafter referred to as "mixed liquor," discussed hereafter.

Certain microorganisms in the RAS are capable of rapid uptake of readily biodegradable carbon sources, such as short chain fatty acids and of forming storage products such as poly-β-hydroxybutyrate (PHB) and poly-β-hydroxyvalate (PHV). The energy for this process is provided by the hydrolysis of intracellular polyphosphates. As a result of an anaerobic selector, a large portion of available carbon sources are removed by the poly-P forming microorganisms, and $PO_4^{-3}$ is released into the water phase. The rapid uptake and storage of carbonaceous substrates by poly-P forming species of microorganisms insures proper phosphate removal in later oxic processes. It also denies access of other competing organisms to the limited amount of substrates available in the wastewater under anaerobic conditions.

In most wastewater treatment plants, one or several anoxic stages are arranged in the BNR process. In the anoxic stage, denitrifiers, i.e., microbial species capable of denitrification, utilize nitrate and/or nitrite as electron acceptors and consume some of the available carbon sources during the denitrification process. $NO_x$ is reduced stepwise to nitrogen gas and released to the atmosphere in the following manner:

$$NO_3^- \rightarrow NO_2^- \rightarrow NO \rightarrow N_2O \rightarrow N_2$$

The nitrate is usually supplied by recycling a certain volume of wastewater at the end of the oxic stage back to the beginning of the anoxic stage.

One or several oxic stages are typically employed in BNR processes. In the oxic stage, air containing about 20% oxygen or pure oxygen, is supplied so that a desired dissolved oxygen level is maintained. Autotrophic nitrifiers, i.e., microbial species capable of using ammonia as their energy source, convert ammonia to nitrite and nitrate under aerobic conditions. The poly-P microbial species in the wastewater uptake phosphate from the water phase and digest their intracellular PHB and PHV storage products converting it into polyphosphate, a compound for energy storage. The polyphosphate pool of the poly-P microbial species is thus replenished and phosphorous is removed from the water phase. The phosphorous is then removed from the system by sludge wasting, which is well known in the art. Under aerobic conditions, the remaining carbon sources in the water phase are further digested by aerobic organisms.

OBJECTS OF THE INVENTION

It is an object of the present invention to provide apparatus for monitoring biological activity in wastewater treatment systems during anaerobic, anoxic and/or oxic stages to maximize the efficiency of the treatment process.

It is a further object of the present invention to provide apparatus for real-time monitoring of the purification of wastewater to enhance control of the anaerobic, anoxic and/or oxic stages of a wastewater treatment process, to maximize process performance in response to transient and other conditions.

Other objects of the present invention will be apparent to those of ordinary skill in the art based on the following detailed description of the preferred embodiments and the appended claims.

SUMMARY OF THE INVENTION

In accordance with the invention, the apparatus monitors and controls biological activity of mixed liquor under anaerobic, anoxic and aerobic conditions by measuring the change of intracellular NAD(P)H of the microorganisms. The ratio of NAD(P)H/(NAD+NAD(P)H) in the microorganisms changes during shifts in metabolic activity of the microorganisms, changes also. The corresponding change in NAD(P)H fluorescence (hereinafter sometimes referred to as "NADH") is detected and then registered by a monitoring system, such as a real time on-line computer data acquisition system, which analyzes the changes and evaluates the biological activity of the mixed liquor. The monitoring system then determines the changes in operating parameters necessary for the wastewater system to maximize the performance of the BNR processes.

A sample of the mixed liquor is pumped from a bioreactor tank to a chamber monitored by a NADH detector in the process. The sample is agitated to ensure uniform suspension of microorganisms in the wastewater and the differences in the fluorescence NADH from between the aerobic, anoxic and/or anaerobic states of the mixed liquor sample while in the chamber are registered and analyzed by the monitoring system. The mixed liquor sample is then returned to the bioreactor tank and the wastewater treatment system is controlled in accordance with the results generated by the monitoring system.

DETAILED DESCRIPTION OF THE INVENTION

Figure 1:
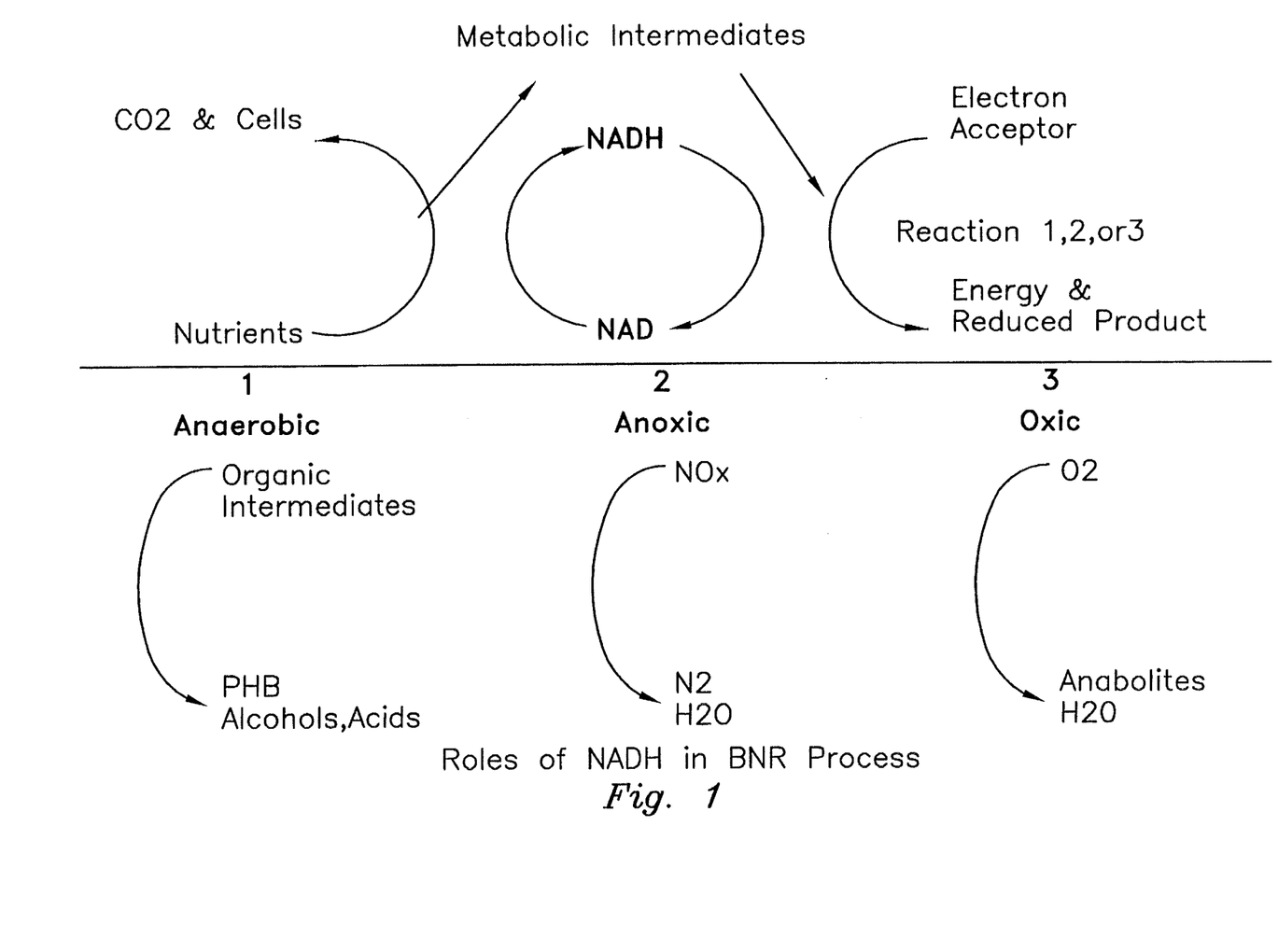
FIG. 1 is a schematic depicting the roles of NADH in a BNR process during anaerobic, anoxic and oxic stages of a wastewater treatment process.
Figure 2:
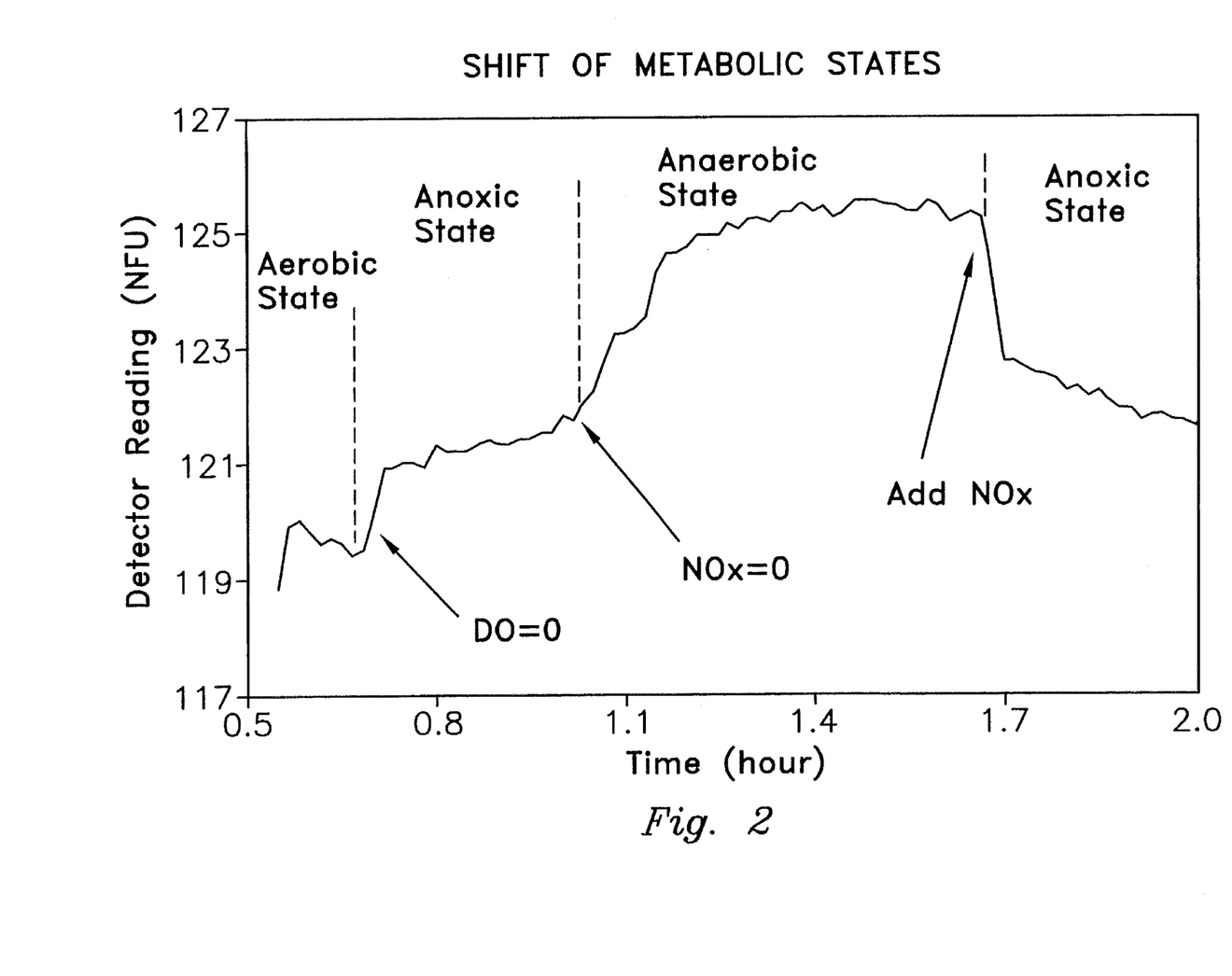
FIG. 2 is a graph depicting the changes in NADH fluorescence during the changes in metabolic activity over a period of time.

The proper evaluation and control of a complex BNR process requires an accurate and current assessment of the metabolic activity of the mixed liquor in a variety of environments and under a number of conditions. Unlike oxygen metabolism, which is only active during the aerobic stage of the BNR process, NADH metabolism is involved in all environmental stages. Thus, NADH is an excellent indicator of metabolic activity that can be used to control the entire BNR process, whereas oxygen metabolism cannot. The dominant organisms and the active biochemical pathways vary with the environmental stages of the bioreactor. However, one common factor is the requirement to transfer energy by the oxidization of available energy sources. Those reactions are summarized in FIG. 1, over the anaerobic, anoxic and oxic stages which shows the role of nicotinamide adenine dinucleotide ($NAD^+$ and NADH) in the energy transfer process.

It is generally believed that under anaerobic conditions the organic materials, such as acetate, for example, are taken up by the cells and converted to acetyl-CoA with the energy for the conversion coming from hydrolysis of intracellular polyphosphate. Acetyl-CoA is further converted to PHB for storage. The reducing power in the form of NADH required for this conversion is obtained by circulating some of the acetyl-CoA through a tricarboxylic acid (TCA) cycle. Also, there may be alternate sources of NADH responsible for this anaerobic conversion of acetyl-CoA to PHB. The concentration of NADH is determined by the balance between the rates of reduction (generation) and oxidization (consumption) reactions. The oxidizing power of the organic compounds involved in the oxidization of NADH in an anaerobic fermentation is much weaker than those of nitrate and oxygen in anoxic and aerobic processes. For example, the reduction potential for the oxidization-reduction pair of pyruvate/lactate is $-0.19$ V while those for $NO_3^-/N_2$ and $\frac{1}{2} O_2/H_2O$, are $+0.74$ V and $+0.82$ V, respectively. Consequently, the rate of NADH oxidization is much slower with anaerobic metabolism than with denitrification and respiration. The intracellular level of NADH at the anaerobic stage is therefore higher than those at the anoxic and oxic stages.

In order to effectively control the operation of the BNR process, it is necessary to regulate specific process parameters based upon the biological activity of the microorganisms in the anaerobic, anoxic and oxic stages of the treatment. Wastewater treatment plants are often subjected to severe transient conditions, such as diurnal variations in organic loads. Controlling the treatment process in response to these conditions requires a fast and effective means of measuring biological activity.

The invention is directed towards an improved apparatus for monitoring and controlling biological activity in wastewater treatment systems by detecting changes in the intracellular NADH level of the microorganisms. The apparatus includes a chamber which is opened and closed to capture a sample of mixed liquor. The chamber contains a NADH sensor which detects changes in the biological activity as the mixed liquor shifts its metabolism due to changes in environmental conditions. These real-time changes in biological activity may be monitored and can be used as the input function for driving process and control algorithms to ensure efficient process performance. Such algorithms are known in the art and are not discussed further. It should be noted that the following embodiments of the present invention are for the purpose of illustration only and are not intended to limit the spirit or scope of the invention as defined in the appended claims in any way.

Figure 3:
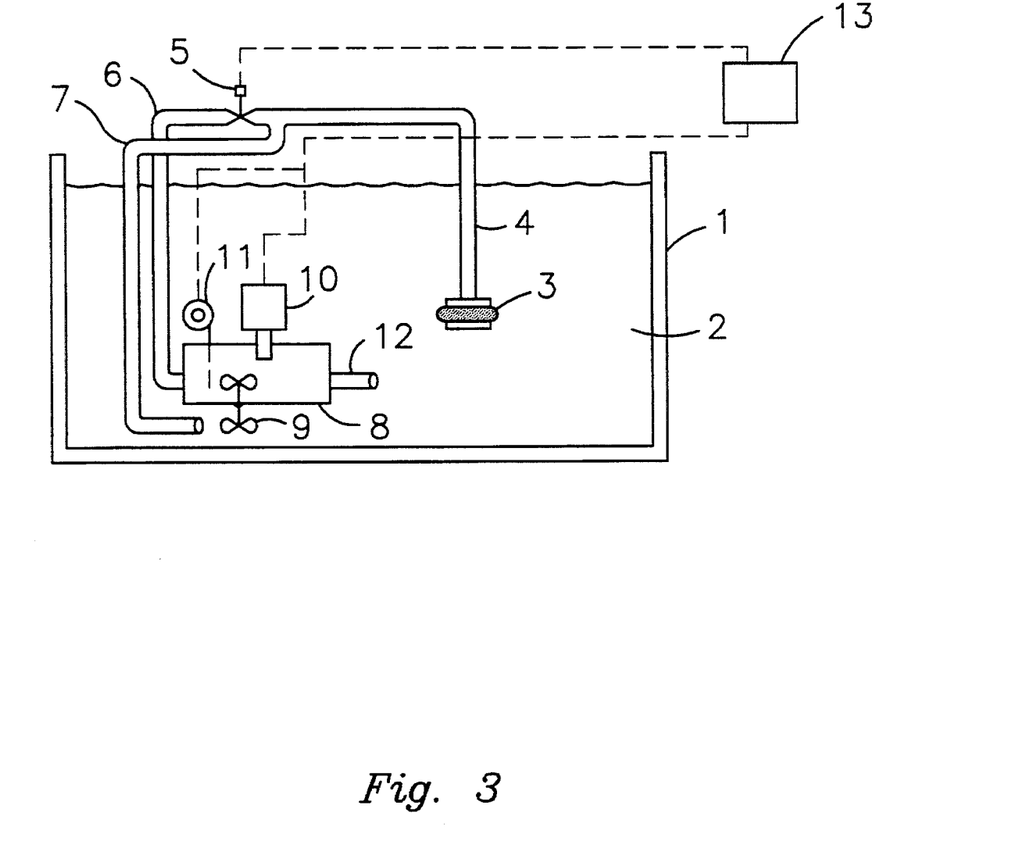
FIG. 3 shows a schematic front elevational view of one preferred embodiment of apparatus of the invention used to monitor a bioreactor tank.

In one preferred embodiment of the invention, shown in FIG. 3, bioreactor tank 1 is filled with mixed liquor 2. Pump 3, situated in tank 1, transfers mixed liquor through feed pipe 4 to return pipe 7. Computer/monitor 13, electrically connected to solenoid valve 5, opens solenoid valve 5 to allow a sample of mixed liquor to pass through inlet 6 to detection chamber 8. Agitator 9 mounted on both sides of both detection chamber 8, is driven by mixed liquor flow from pipe 7 and ensures uniform suspension of microorganisms in the mixed liquor wastewater in detection chamber 8.

Detection probe 10 is positioned in detection chamber 8 and electrically connected to computer/monitor 13 to detect changes in fluorescence of the NADH in the wastewater sample. A preferred detection probe 10 is disclosed in U.S. Pat. No. 4,577,110, which is owned by the assignee hereof and is hereby incorporated by reference. Of course, other apparatus can be employed as a probe so long as the same detection capabilities are available. Computer/monitor 13 may be of any suitable type such as a personal computer or the like. Feeding device 11, also connected to computer/ monitor 13, provides nutrients to the microorganisms in the wastewater in detection chamber 8. Outlet 12 connected to detection chamber 8 allows the mixed liquor to be flushed from detection chamber 8 and replaced with a fresh sample.

Figure 9:
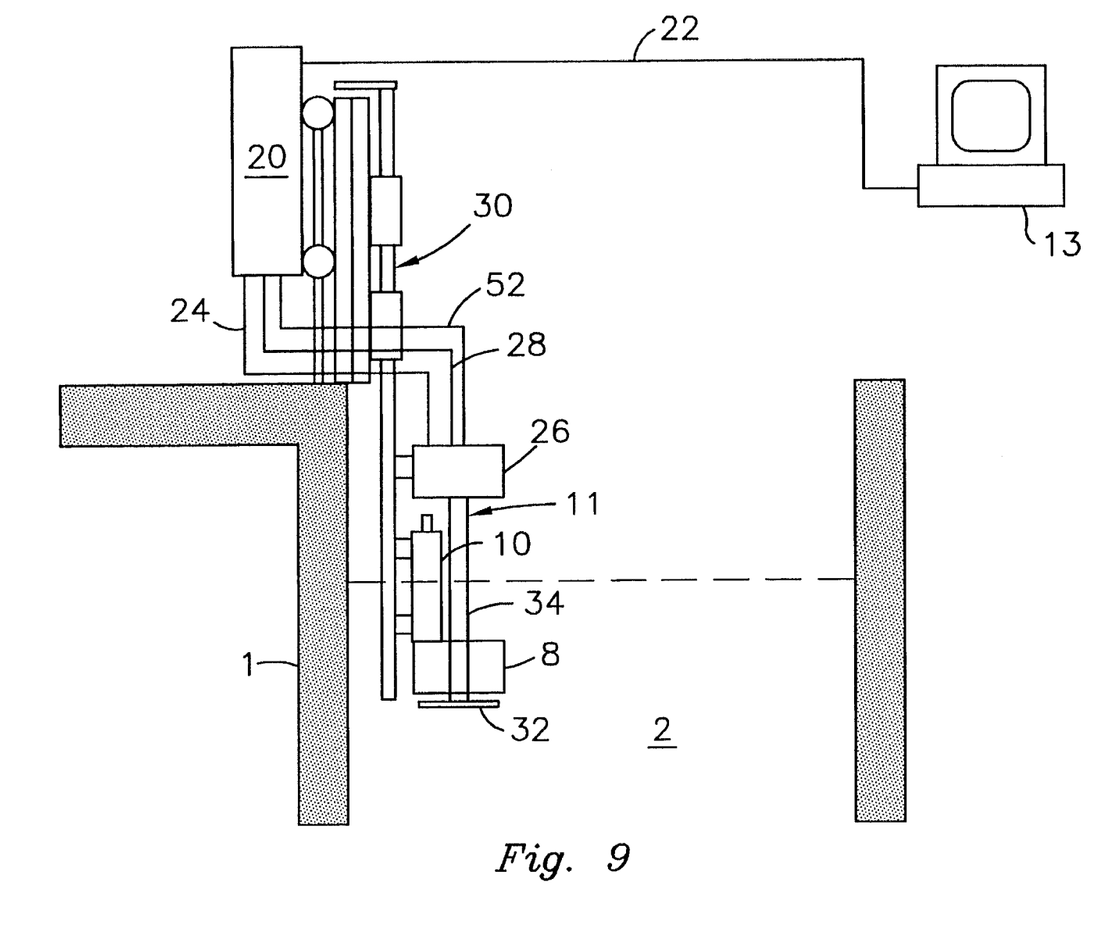
FIG. 9 shows a schematic front elevational view of another preferred embodiment of apparatus of the invention used to monitor a bioreactor tank.

Another especially preferred embodiment of apparatus for sampling mixed liquor is shown in FIG. 9. A bioreactor tank 1 (or alternatively a channel) contains wastewater and sludge as mixed liquor 2. Detection apparatus is mounted on the top of bioreactor tank 1 and extends into mixed liquor 2. The apparatus includes a central control unit 20 connected to a computer/monitor 13 by wire connection 22. Similarly, central control unit 20 connects to detection probe 10 by way of wire connection 24. Motor control 26 also connects to central control unit 20 by way of connection wire 28. Power is supplied to motor control 26 by wire connection 52.

Figure 10:
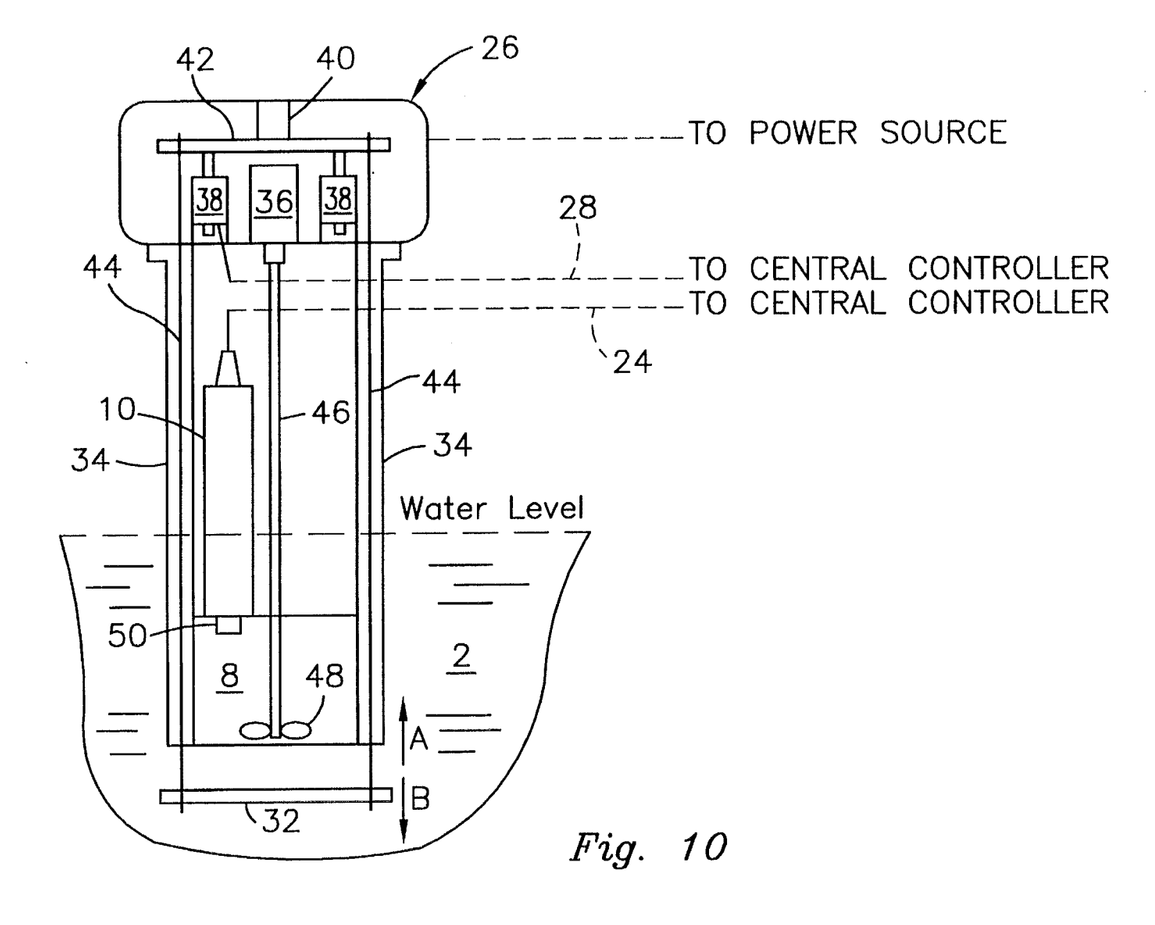
FIG. 10 shows an exploded schematic view, partially taken in section, of wastewater sampling apparatus in accordance with aspects of the invention.

Mixed liquor sampling unit 11 is mounted onto a movable carriage 30 which is capable of moving substantially vertically upwardly and downwardly to move detection probe 10 into and out of mixed liquor 2. The precise structure of movable carriage 30 is not critical so long as movability of mixed liquor sampling unit 11 is achieved. Detection probe 10 has its detection end 50 located in detection chamber 8 (as shown in FIG. 10). Detection chamber 8 has a movable cover 32 which moves vertically upwardly and downwardly along guide channels 34.

FIG. 10 shows an exploded view of one specific construction of mixed liquor sampling unit 11. Motor control 26 includes gear motor 36, solenoid pullers 38 and spring 40 connected to base plate 42. Base plate 42 also connects to guide rods 44 which extend through guide channels 34. Guide rods 44 terminate on their other end at movable cover 32. Gear motor 36 connects to propeller rod 46 which connects to propeller 48. Propeller 48 is located interiorly of detection chamber 8 which also contains detection end 50.

Figure 11:
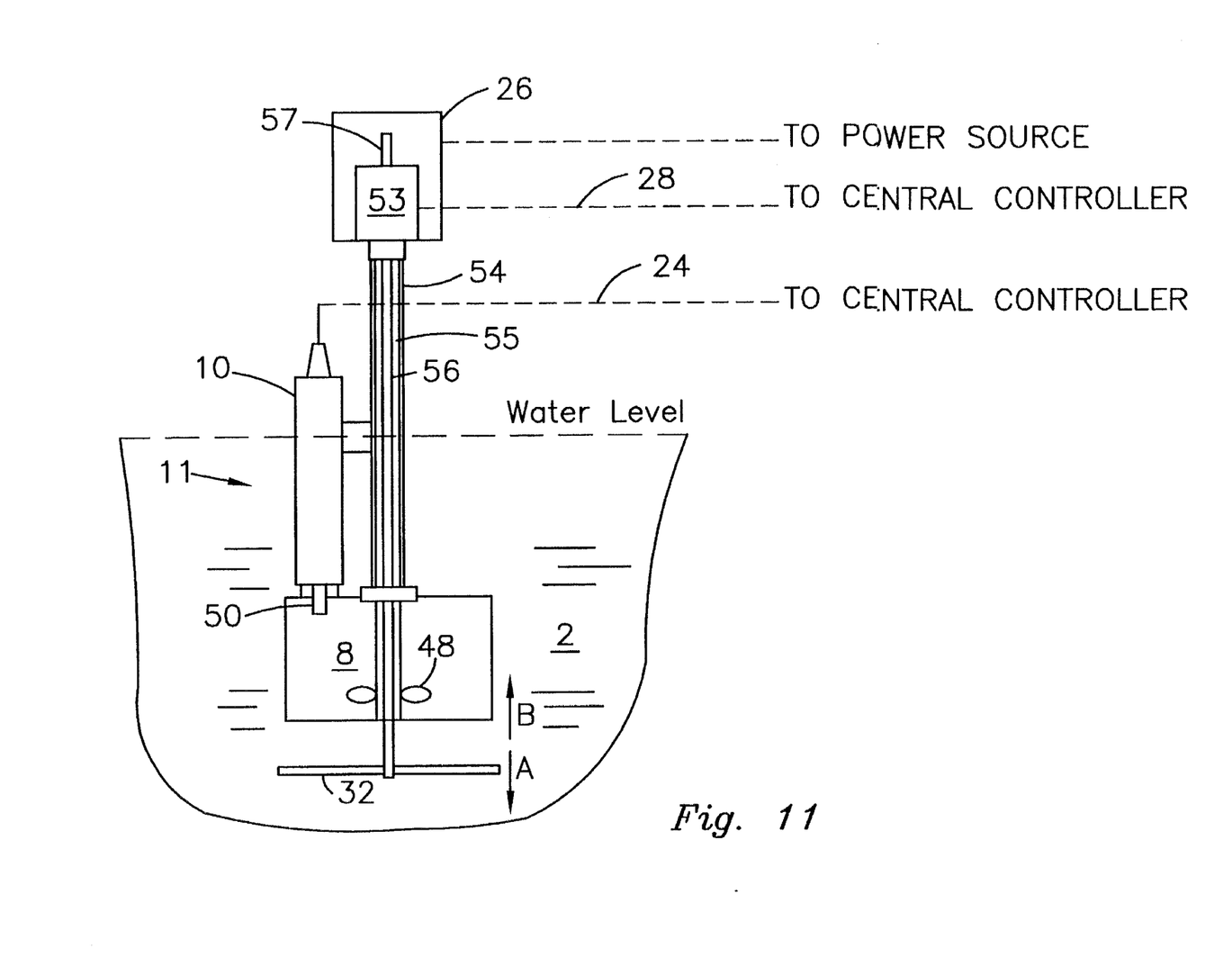
FIG. 11 shows an exploded schematic view, partially taken in section, of another embodiment of the apparatus shown in FIGS. 9 and 10.

FIG. 11 shows an exploded view of another specific construction of a mixed liquor sampling unit. Motor control 26 includes low RPM motor 53 which connects to a central controller by way of connection wire 28. RPM motor 53 drives an ACME shaft 57 which connects to inner shaft 56, which extends through outer shaft 55. The assembly formed from inner and outer shafts 56 and 55, respectively, is shielded by stainless steel pipe 54. Pipe 54 connects to chamber 8 which contains propeller 48 and receives detection end 50 of detection probe 10 which connects to the central controller by way of wire connection 24. Detection chamber 8 has an open side which may be closed with movable cover 32, which connects to inner shaft 56.

One preferred operation of the system as shown in FIG. 3 is as follows. Pump 3 continuously pumps mixed liquor through feed line 4 and return line 7. At a designated time, solenoid valve 5 is activated electronically by a computer connected to computer/monitor 13, which opens the valve to permit a sample of mixed liquor to pass through inlet 6 to detection chamber 8. The solenoid valve 5, which is controlled by computer/monitor 13, shuts off the flow of the mixed liquor to detection chamber 8 after a predetermined amount of sample has passed through feed line 4, return line 7, detection chamber 8 and outlet 12, providing for the complete flushing of detection chamber 8 of a prior sample of mixed liquor and refilling with a new sample of mixed liquor. 0f course, outlet 12 is equipped with a suitable blocking device (not shown) to prevent ingress of wastewater into detection chamber 8 through outlet 12.

The mixed liquor resumes its continuous flow through return line 7 after solenoid valve 5 closes. This flow propels agitator 9 which ensures that microorganisms in the sample are suspended uniformly inside detection chamber 8. Uniform suspension assists in achieving an accurate detection of NADH by detection probe 10. Also, depending on the specific application, certain amounts of reagents may be fed to detection chamber 8 at the moment when the chamber is filled with a fresh sample of mixed liquor.

After filling detection chamber 8 with a fresh sample of mixed liquor, the metabolic activity of the sample changes from an aerobic to an anoxic to an anaerobic condition as time elapses. The time intervals that the sample spends in the aerobic, anoxic and anaerobic states, and the changes in the intracellular NADH corresponding to these changes in metabolic activity, may be detected by probe 10, registered and analyzed by computer 13. The use of computer 13 allows for the real-time, on-line monitoring of the biological activity in detection chamber 8. Interpretation of the information obtained by the present invention depends on its specific application and installation location in the WWTP. The design of the apparatus may be modified to meet the specific requirements of the wastewater treatment plant and its location.

The embodiment of the apparatus shown in FIGS. 9 and 10 operates in a different fashion from that of the apparatus shown in FIG. 3. When it is desired to sample a portion of mixed liquor, a control signal is sent to solenoid pullers 38 via connection wire 28, which together apply a force to base plate 42 and push guide rods 44 and movable cover 32 in the direction of arrow "B", working against the pulling action of spring 40. Detection chamber 8 is then in an open position. Rotation of propeller 48 causes mixed liquor positioned interiorly of chamber 8 to move outwardly of the chamber and into the body of mixed liquor 2 and portions of the body of mixed liquor 2 outside of chamber 8 to move inwardly of detection chamber 8, thereby flushing detection chamber 8 and supplying a fresh quantity of mixed liquor for sampling.

After a fresh sample is taken into detection chamber 8, the control signal to solenoid pullers 38 is cut off, thereby releasing the pushing force of solenoid pullers 38. Spring 40 returns to its normal position, pulling base plate 40, guide rods 44 and movable cover 32 in the direction of arrow "A" and chamber 8 is then in a closed position.

A sample is then analyzed in the same manner as described with respect to FIG. 3. Upon completion of sample analysis, the central controller actuates solenoid pullers 38 which permits downward movement of movable cover 32 in the direction of arrow "B". This opens detection chamber 8 again for further flushing and uptake of a new sample.

Still another embodiment of sampling apparatus of the invention is shown in FIG. 11. The movable cover 32 and propeller 48 are driven by the same reversible low RPM motor 53 which coaxially connects inner shaft 56 and outer shaft 55. The coaxial assembly is shielded by stainless steel pipe 54. When it is desired to sample a portion of mixed liquor, a control signal is sent to motor 53, which changes the direction of rotation at the command. Movable cover 32 is pushed in the direction of arrow "B" by inner shaft 56 driven by an ACME shaft 57 connected to motor 53. At the open position, rotation of propeller 48 forces an exchange of mixed liquor between the inside and outside of detection chamber 8 and detection chamber 8 is filled with a fresh sample of mixed liquor. After a given period of time, e.g. 30 seconds, motor 53 is programmed to reverse its rotation direction, movable cover 32 is pulled in the direction of arrow "A" until detection chamber 8 is fully closed.

The fresh mixed liquor sample is analyzed in the same manner as described with respect to FIG. 3. Upon completion of sample analysis, the central controller reverses the direction of motor 53, which pushes the movable cover 32 to the open position again for further flushing and uptake of a new sample.

Figure 8:
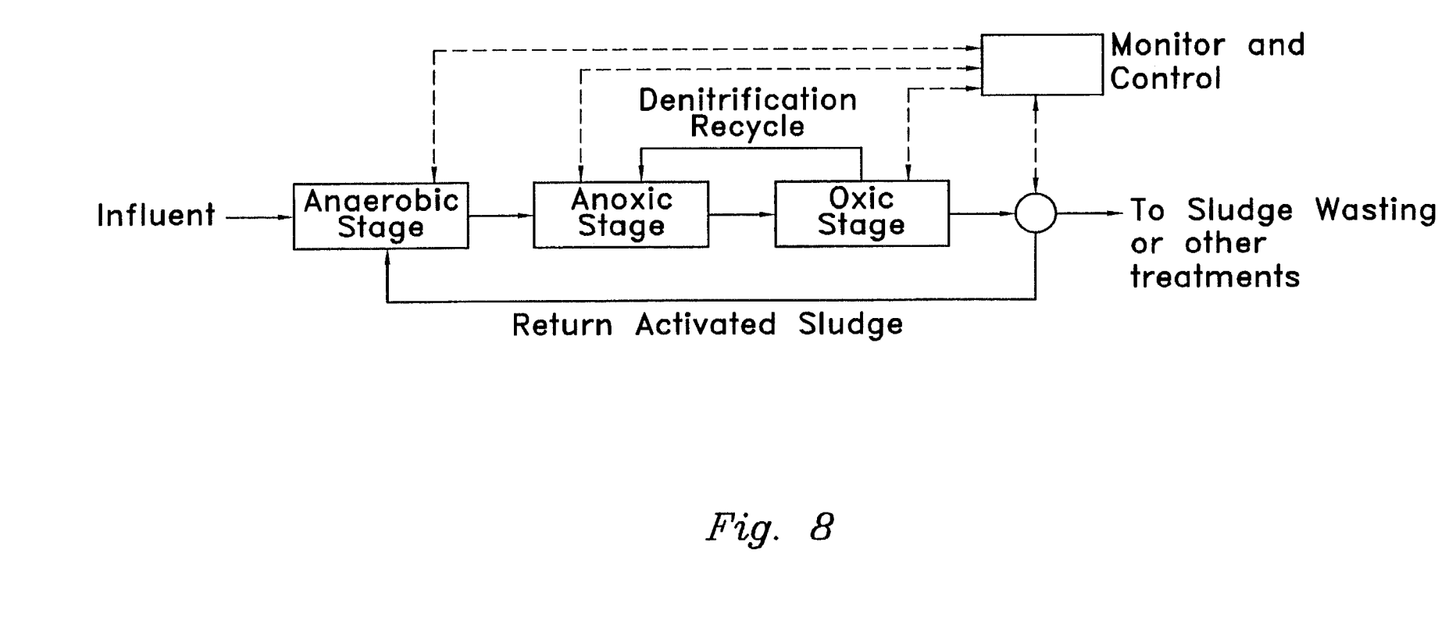
FIG. 8 is a schematic of the monitoring of a typical wastewater treatment process utilizing embodiments of the invention.

The apparatus for monitoring biological activity can be used in all stages of a WWTP or any combination thereof. Incorporation of the apparatus into a typical WWTP is shown schematically in FIG. 8. The general application and use of the apparatus shown in FIGS. 3, 9, 10 and 11 in the anaerobic, anoxic and/or aerobic stages of a typical wastewater treatment plant will now be discussed.

1. Use in the anaerobic stage

Figure 4:
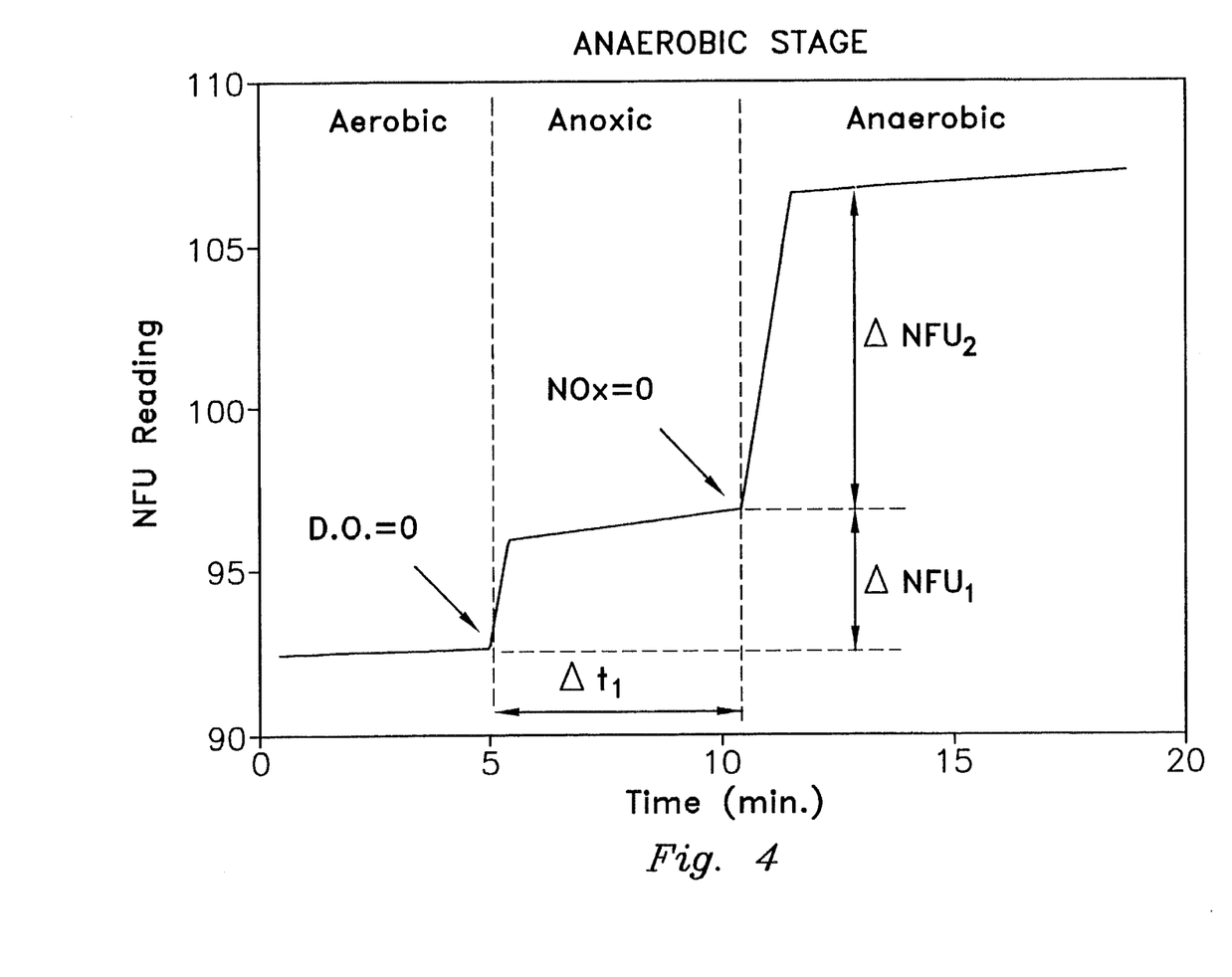
FIG. 4 is a graph of an operational profile depicting changes in NADH fluorescence over time from an anaerobic stage of treatment.

The operational profile of the biological activity monitoring apparatus when installed in the anaerobic stage of a WWTP is illustrated in FIG. 4. The term NFU, as shown in FIG. 4 and as used hereinafter, represents a normalized or relative quantity or level of NADH fluorescence. Three parameters, $\Delta NFU_1$, $\Delta NFU_2$, and $\Delta t_1$ are analyzed for the evaluation of the biological activity of the microorganisms. $\Delta NFU$ represents the total increase in NADH concentration; $\Delta NFU_1$ represents the first step increase of NADH concentration; $\Delta NFU_2$ represents the second step increase of NADH concentration; and $\Delta t_1$ represents the time period of the anoxic portion during the anaerobic stage of the WWTP. The overall change in NADH concentration through the aerobic, anoxic and anaerobic states of the mixed liquor from the anaerobic stage of treatment can be expressed according to the equation:

$$\Delta NFU = \Delta NFU_1 + \Delta NFU_2$$

$\Delta NFU$ is proportional to the overall biomass concentration in the sample. Although the absolute value of the biomass concentration cannot be determined from a single measurement, it is possible to accurately and reliably estimate the population distribution of the denitrifying and non-denitrifying microorganisms by methods known in the art. When the concentration of dissolved oxygen in the sample decreases to below a critical value and is finally depleted, those microorganisms that cannot use nitrate and/or nitrite as electron acceptors switch to an anaerobic state, shifting the mixed liquor from an aerobic to an anoxic state. This corresponds to the first NADH increase, $\Delta NFU_1$. The majority of microorganisms which cannot perform denitrification are autotrophic nitrifiers, such as Nitrosomonas and Nitrobacter. Therefore, the value of $\Delta NFU_1/\Delta NFU$ is proportional to the percentage of nitrifiers in the overall biomass population. Conversely, those microorganisms that are capable of performing denitrification consume all the nitrate in the sample before entering an anaerobic state.

The second step increase in NADH, $\Delta NFU_2$, from the sample corresponds to a shift in the sample from an anoxic to an anaerobic state. Therefore, the value of $\Delta NFU_2/\Delta NFU$ is proportional to the percentage of denitrifiers in the overall biomass population.

One possible application of the biological activity monitoring apparatus in the anaerobic stage of a WWTP is to determine the efficiency of $NH_3$ removal. When the value of $\Delta NFU_1/\Delta NFU$ is below a predetermined value, the population of nitrifiers in the bioreactor tank is lower than the required amount for proper $NH_3$ removal. Changing operational parameters, such as increasing hydraulic retention time or increasing the RAS flow rate, for example, is helpful in modifying the process to make the WWTP more efficient. If the alteration of the return activated sludge (RAS) flow rate parameter is adopted, it should be continued until the value of $\Delta NFU_1$ reaches a set point so that the population of nitrifiers is large enough to maintain the proper nitrification rate.

$\Delta t_1$ is the time the mixed liquor spends in the denitrification stage before the sample shifts to the anaerobic state. When $\Delta t$ represents the hydraulic retention time of the mixed liquor in the anaerobic stage of bioreactor tank 1, then the ratio of $\Delta t_1/\Delta t$ indicates that a fraction of the bioreactor is used for denitrification within the whole anaerobic stage in the WWTP.

2. Use in the Anoxic Stage

Figure 5:
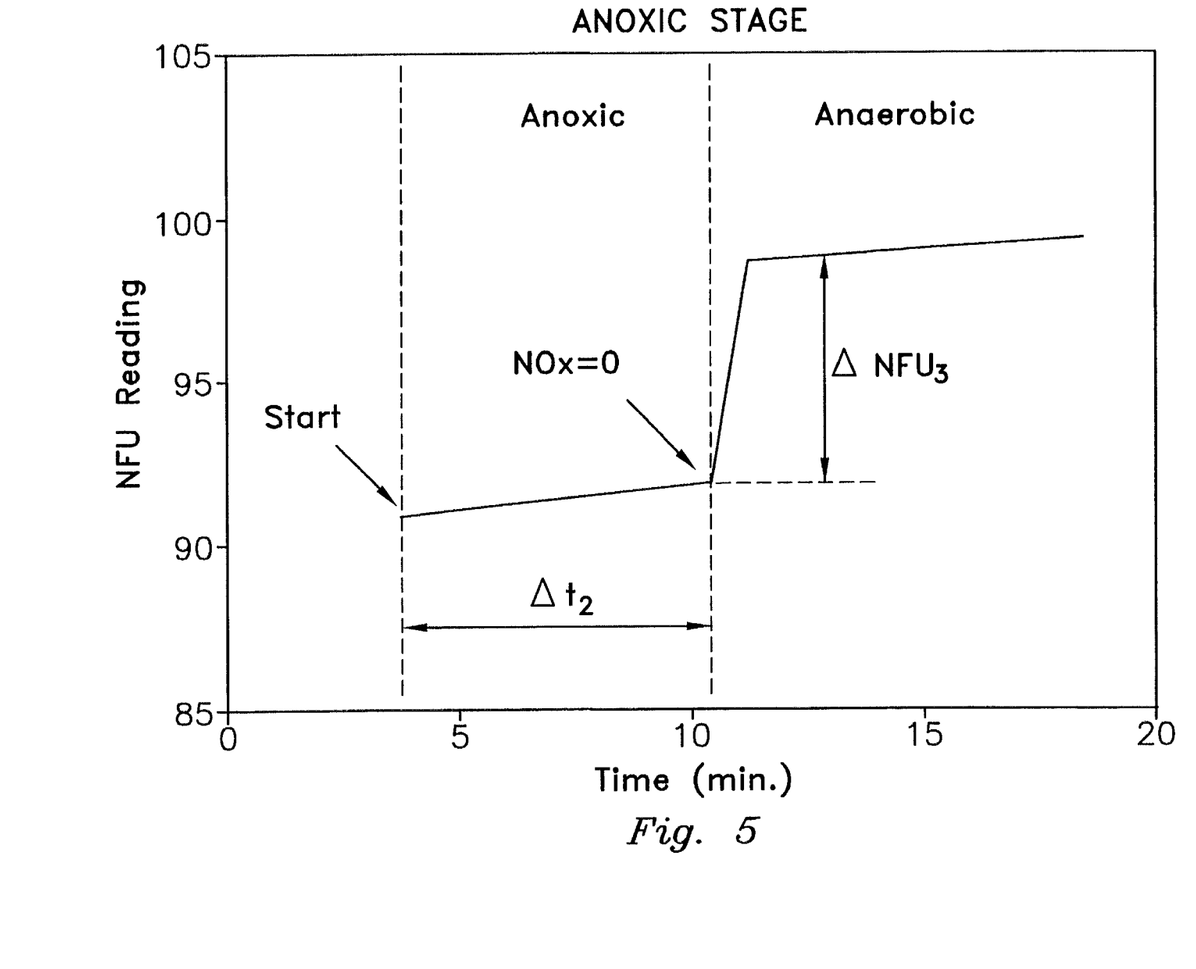
FIG. 5 is a graph of an operational profile depicting changes in NADH fluorescence over time from an anoxic stage of treatment.

The operational profile of the biological activity monitoring apparatus when used in the anoxic stage of a WWTP is illustrated in FIG. 5. Two parameters, $\Delta NFU_3$, which represents the change in NADH fluorescence during the shift of anoxic to anaerobic state of the sample, and $\Delta t_2$, which represents the length of time in minutes of the anoxic state of the sample, are useful in monitoring and controlling the anoxic stage of a WWTP.

The value of $\Delta t_2$ is measured as the time period from capture of the sample in detector chamber 8 to the moment when denitrification is completed. The value of $\Delta t_2$ can be used to evaluate whether the hydraulic retention time in the whole anoxic stage, $T_{den}$, is long enough for the denitrification process to be completed. The ideal time is $T_{den} = \Delta t_2$. To approach this ideal denitrification time, the internal recycling rate can be adjusted accordingly.

3. Use in the Oxic Stage

Figure 6:
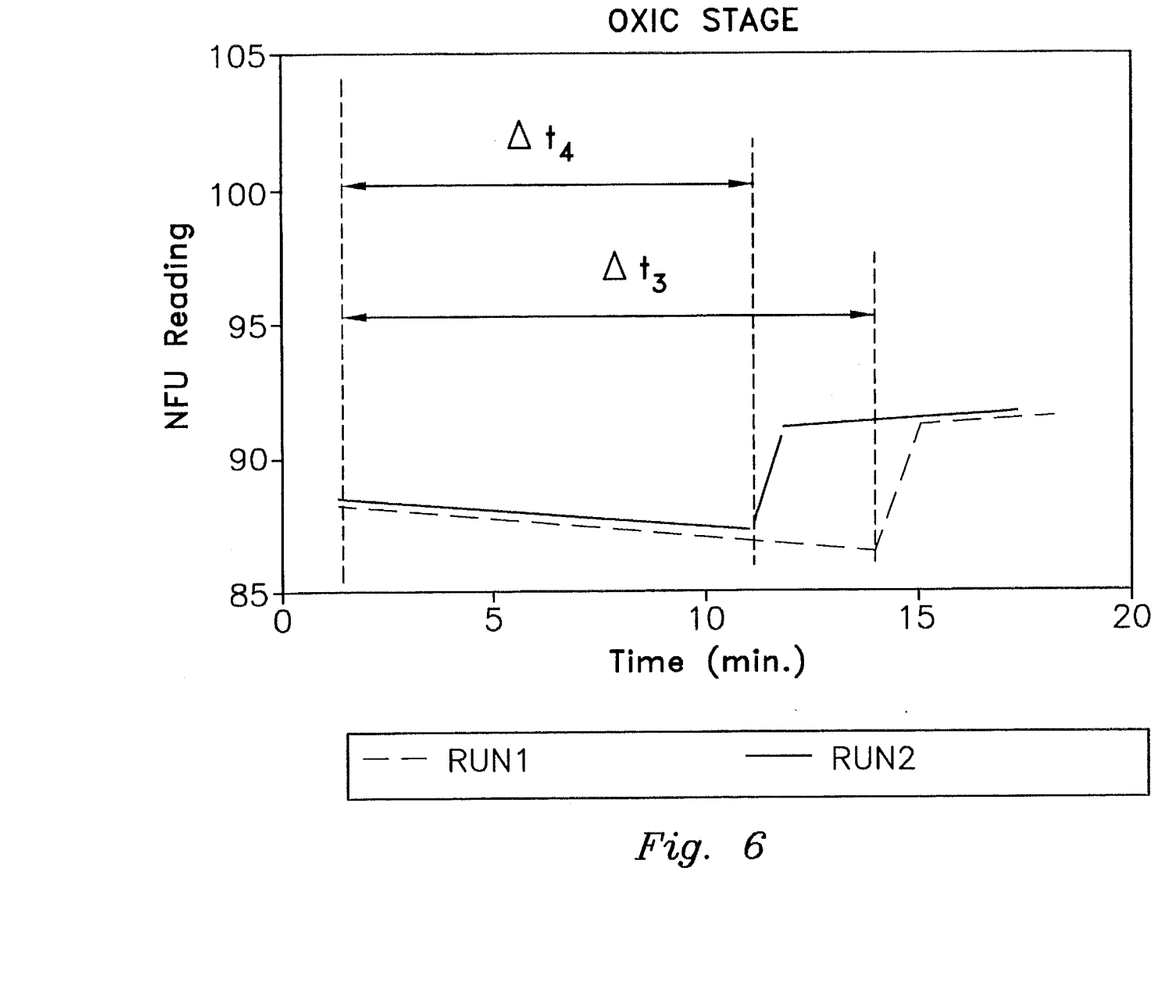
FIG. 6 is a graph of an operational profile depicting the changes in NADH fluorescence over time from an oxic stage of treatment.

An operation profile for the use of the apparatus at the end of the oxic stage of a WWTP is illustrated in FIG. 6. Since the degradation of pollutants is almost completed, the BOD concentration is very low, and the change in fluorescence of NADH concentration corresponding to the metabolic shift of the captured sample from an aerobic to an anoxic state is very small, but nevertheless detectable.

One of the applications of the invention in the oxic stage is to serve as a $NH_3$ meter. This aspect preferably operates as follows: Two sets of monitoring apparatus (not shown) may be used in the same location in bioreactor tank 10. Both detection chambers 8 are filled with mixed liquor samples at the same time. For the first chamber, $\Delta t_3$ represents the time from capturing the sample to the start of the anoxic state of the sample registered by computer 13. In the second chamber, immediately after the chamber is filled with mixed liquor, a certain amount of $NH_3$ is added so that the $NH_3$ concentration change in detection chamber 8 is known, for example 0.5 ppm, from the feeding device 11. The time, $\Delta t_4$, from capturing the sample in chamber 8 to the start of the anoxic state of the wastewater in the detection chamber 8 is then registered.

Figure 7:
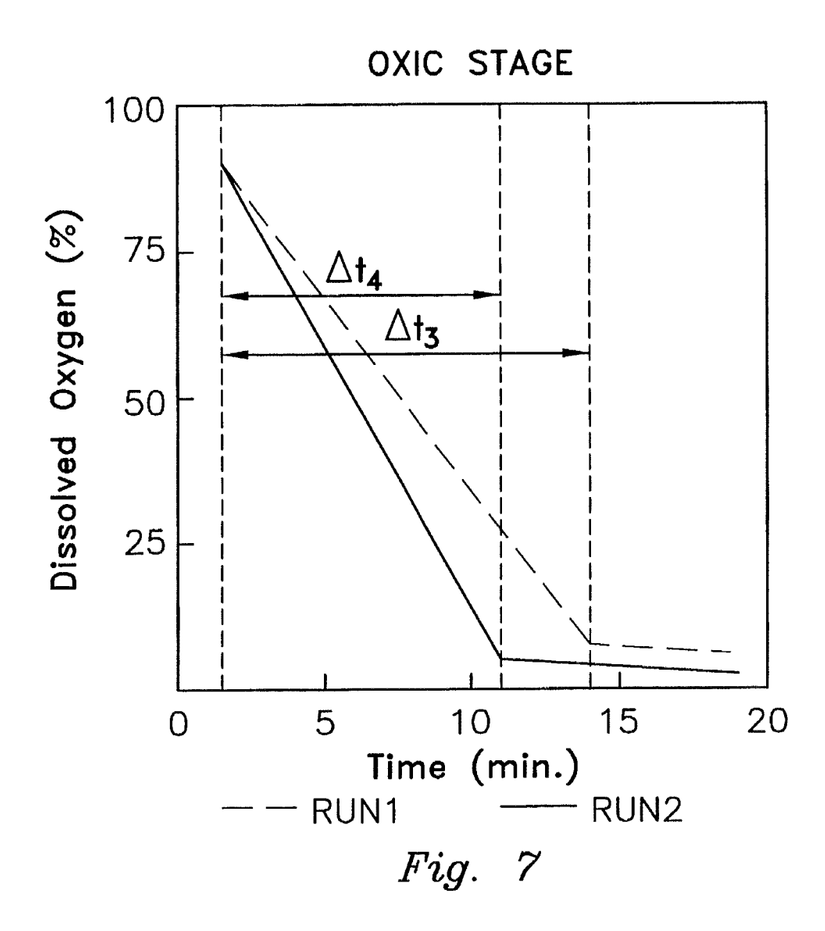
FIG. 7 is a graph of an operational profile depicting the changes in percentage of dissolved oxygen over time from an oxic stage of treatment.

In order to determine the $NH_3$ concentration, it is assumed that the dissolved oxygen (D.O.) consumption in the oxic stage is mostly due to the nitrification process. A typical operational profile for the consumption of dissolved oxygen during the oxic stage is illustrated in FIG. 7. Experimental results performed indicate that the oxygen consumption rate of the mixed liquor changed negligibly when acetate and glucose (5 ppm) were added to the system with feeding device 11, while significant change was observed when 0.1 ppm of $NH_3$ was added to the system.

The concentration of $NH_3$ in the oxic state of the WWTP is expressed as:

$$(NH_3)_1 = \Delta NH_3 \Delta t_4 / (\Delta t_3 - \Delta t_4)$$

Where $(NH_3)_1$ is the ammonia concentration in the water phase at the end of the oxic stage, $\Delta NH_3$ is the known amount of ammonia added to the second detection chamber, respectively. The present invention can be used in the oxic state of a WWTP to accurately monitor the $NH_3$ concentration in the bioreactor tank. Various system parameters, such as retention time, can then be altered to enhance the nitrification process and, if necessary, to increase the efficiency of the waste water treatment system.

In the method according to the invention, information about biomass composition, efficiency of denitrification, nitrification and BOD removal processes and $NH_3$ concentration in the oxic stage of a WWTP can be obtained. This information may be monitored and analyzed by computer 13 which evaluates the biological activity in the anaerobic, anoxic and aerobic stages of a WWTP and can alter system parameters such as the RAS flow rate, the oxygen supply rate, the internal recycling rate or the hydraulic residence time or the like to maximize the efficiency of the WWTP in response to transient conditions or normal operation.

Although the invention has been illustrated by use of specific embodiments thereof, it should be noted that a wide variety of equivalents may be substituted for the specific elements and steps shown and described without departing from the spirit or scope of this invention as defined in the appended claims. For example, the present invention can be used to monitor various parameters of the individual aerobic, anoxic and anaerobic stages of a wastewater treatment plant individually, or the invention can be used to monitor and control the entire WWTP operation in maximizing the efficiency thereof. Additionally, individual components of the invention may utilize equivalent substitutions. For example, the sample in detection chamber 8 may be uniformly suspended by use of any means of controllable agitation. The filling of the detection chamber with a predetermined amount of wastewater may be performed by a means other than a feed line, a solenoid valve, an inlet line and a return line as depicted in FIG. 3. The monitoring system may consist of a personal computer with applicable software or individual electronic meters to be analyzed separately, all of which are known in the art. It should also be emphasized that although emphasis has been placed on measurement of NADH fluorescence to determine the quantity or concentration of NADH, this emphasis is simply the preferred manner in which NADH quantity or concentration is determined. Other means and methods for accomplishing this task are fully contemplated as falling within the scope of this invention. For example, NADH quantity or concentration may be determined by use of biochemical assays, such as those sensitive to NADH. Such assays are known in the art and typically employ enzymes and substrate components to assist in the assay. Still other means known and not yet developed can be used so long as they are capable of determining the presence of NADH.

What is claimed is:

1. Apparatus for monitoring biological activity in a fluid treatment process comprising:

a fluid sample container having a fluid flow opening connected to a fluid supply;

a sample agitator connected to said container wherein flow of fluids in and out of said container is assisted by said agitator;

a container door positioned adjacent said opening and adapted to move toward and away from said opening;

a radiation source positioned relative to said container to irradiate a sample of fluid in said container with radiation of a selected wavelength;

a probe positioned relative to said sample to detect changes in fluorescence emitted by NADH in microorganisms within said sample in response to said radiation;

means for analyzing changes in NADH fluorescence detected by said probe; and a controller connected to said analyzing means to introduce samples into and remove samples from said container at selected time intervals.

2. The apparatus of claim 1 further comprising a storage device connected to said probe for registering changes in NADH fluorescence detected by said probe.

3. The apparatus defined in claim 2 wherein said storage device, said means for analyzing changes in NADH fluorescence and said controller comprise a computer.

4. The apparatus defined in claim 1 wherein said radiation source and said probe are integral and radiate said sample at a wavelength of 360 nm, and detect the fluorescence of NADH at 460 nm.

5. The apparatus defined in claim 1, wherein said agitator comprises a mechanical stirrer positioned in said sample container.

6. The apparatus defined in claim 5 wherein said stirrer is operated by a motor.

7. The apparatus defined in claim 1 further comprising at least one opening/closing member connected to said door and adapted to move relative to said container.

8. The apparatus defined in claim 7 further comprising 1) a spring connected to said opening/closing member to apply substantially constant closing force to said door relative to said opening and 2) a solenoid connected to said opening/closing member to actuate opening force to said door relative to said opening sufficient to overcome the closing force of said spring.

9. The apparatus defined in claim 7 further comprising 1) a spring connected to said opening/closing member to apply substantially constant closing force to said door relative to said opening and 2) a motor connected to said opening/closing member to actuate opening force to said door relative to said opening sufficient to overcome the closing force of said spring.

10. Apparatus for in situ monitoring biological activity in a wastewater treatment process comprising:

a wastewater sample chamber immersed in a wastewater supply undergoing treatment and having an opening to permit ingress and egress of wastewater;

a movable cover positioned adjacent said opening;

a wastewater agitator positioned in the sample chamber;

a probe having a detection end positioned interiorly of the sample chamber;

a biological activity change analyzer connected to said probe; and a controller connected to said analyzer and said cover to introduce samples into and remove samples from said chamber at selected time intervals.

11. The apparatus defined in claim 10 wherein said probe includes a radiation source to irradiate microorganisms within a sample of the wastewater and a detector which senses changes in fluorescence emitted by NADH in said microorganisms in response to radiation.

12. The apparatus of claim 11 further comprising a storage device connected to said probe for registering changes in NADH fluorescence detected by said probe.

13. The apparatus defined in claim 12 wherein said storage device, said analyzer and said controller comprise a computer.

14. The apparatus defined in claim 11, wherein said agitator comprises a mechanical stirrer.

15. The apparatus defined in claim 14 wherein flow of liquids into and out of said chamber is assisted by said agitator.

16. The apparatus defined in claim 15 wherein said cover is adapted to move toward and away from said opening.

17. The apparatus defined in claim 16 further comprising at least one opening/closing member connected to said cover and adapted to move relative to said chamber.

* * * * *